United States Patent [19]
Burdick et al.

[11] Patent Number: 5,838,015
[45] Date of Patent: Nov. 17, 1998

[54] INFRARED SCENE PROJECTOR

[75] Inventors: David L. Burdick; Robert Z. Dalbey, both of Ridgecrest, Calif.

[73] Assignee: The United States of America as represented by the Secretary of the Navy

[21] Appl. No.: 806,131

[22] Filed: Mar. 3, 1997

[51] Int. Cl.[6] ........................................ G01J 1/00
[52] U.S. Cl. .................... 250/504 R; 250/495.1
[58] Field of Search ............................. 250/493.1, 495.1, 250/504 R

[56] References Cited

U.S. PATENT DOCUMENTS

| | | | |
|---|---|---|---|
| 3,735,137 | 5/1973 | Bly | 250/504 R |
| 3,995,934 | 12/1976 | Nath | 250/495.1 |
| 4,087,159 | 5/1978 | Ulrich | 350/96.12 |
| 4,233,493 | 11/1980 | Nath | 250/504 R |
| 4,929,841 | 5/1990 | Chang | 250/504 R |
| 5,151,098 | 9/1992 | Loertscher | 606/16 |
| 5,336,888 | 8/1994 | Odom | 250/504 R |

OTHER PUBLICATIONS

Bly, J. V. "Passive Visible to Infrared Transducer for Dynamic Infrared Image Simulation," Optical Engineering, 21, No. 6, Nov. 1982, 1079–1082.

Bly, V. T., & Cox, J. T. "Infrared Absorber for Ferroelectric Detectors," Applied Optics, 33, No. 1, 1 Jan. 1994, 26–30.
Hass, G., Schroeder, H. H., & Turner, A. F. "Mirror Coatings for Low Visible and High Infrared Reflectance," *J. Opt. Soc. Am.*, 1, No. 1, Jan. 1956, 31–35.
Hudson, R. D., Jr. *Infrared System Engineering*. New York: John Wiley & Sons, 1969, pp. 67–85.

*Primary Examiner*—Bruce Anderson
*Attorney, Agent, or Firm*—David S. Kalmbaugh

[57] ABSTRACT

A scene projector has spaced-apart optical fibers transmitting electromagnetic radiation by total internal reflection to a like number of spaced-apart absorber structures that are each mounted on the opposite end of one of the optical fibers. The absorber structures absorb the transmitted radiation, convert it to heat, and emit radiation at longer wavelengths, primarily IR. Optionally, a coating having greater emissivity at the longer wavelengths of radiation may be added to the structures to increase radiation at these longer wavelengths. Each optical fiber and absorber structure has a degree of thermal isolation from the adjacent fibers and structures to increase spatial thermal resolution as compared to contemporary monolithic imaging devices. Since the scene projector is optically driven, bulky electronic addressing lines and associated control structure are not needed. Consequently, the fill factor, the active area of pixels to total area, can be very high, over 70%, and pixel size is limited only by the state-of-the-art of lithography and micro-processing techniques.

5 Claims, 1 Drawing Sheet

INFRARED SCENE PROJECTOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Most mature technologies for IR scene generation can be classified into three categories: thermal emitter arrays, spacial light modulators, and laser-based projection systems.

Thermal emitter arrays are those generators that are based on individually addressable resistively heated elements in an array. Some thermal emitter array designs provide for high fill factor, but, generally speaking, they are slow (<60 hertz) and have poor spatial resolution. The associated address controls for activating individual elements to generate a particular scene can be a major drawback of using thermal emitter arrays.

Spatial light modulators are those devices that spatially modulate incident radiation from IR sources. Such devices include liquid crystal modulators, metallic gratings, and deformable mirror arrays. Typically these devices are wavelength limited, can be relatively slow, may have poor thermal resolution, and have limited temperature dynamic range.

Laser-based projection systems use steered laser beams to write images directly on an imaging detector array. This technology requires high intensity laser sources modulated so the cumulative energy arriving at each detector pixel is equivalent to that radiation which would come from the natural scene being modeled. The spatial resolution, thermal resolution, and frame rate all depend on the system controller that drives the position of the laser as a function of time. Such controllers are expensive and complicated and software maintenance is a prime concern. While these devices will meet very specialized needs, their cost and complexity limit their application.

Thus, a continuing need has been discovered for a cost-effective scene projector that absorbs transmitted electromagnetic radiation, converts it to heat and emits radiation at longer wavelengths.

SUMMARY AND OBJECTS OF THE INVENTION

The present invention is directed towards providing a transducer of electromagnetic radiation. At least one wave guide transmits electromagnetic radiation. A selective absorber structure on one end of the waveguide absorbs the electromagnetic radiation, converts the absorbed radiation into heat, and emits radiation at wavelengths longer than the incident electromagnetic radiation. An infrared scene projector having a plurality of spaced-apart optical fiber waveguides and selective absorber structures provides spatial and thermal resolution at usable display rates.

An object of the invention is to provide a transducer that absorbs radiation, converts it to heat, and emits at longer wavelengths of radiation.

An object of the invention is to provide a transducer that absorbs electromagnetic radiation, converts it to heat, and emits infrared radiation.

Another object is to provide a transducer having at least one waveguide transmitting electromagnetic radiation by total internal reflection for emission of radiation at longer wavelengths.

Another object is to provide a transducer having an optical fiber provided with a selective absorber structure that transmits electromagnetic radiation by total internal reflection, absorbs the radiation, converts it to heat, and emits radiation at longer wavelengths.

Another object of the invention is to provide a transducer having a plurality of spaced-apart optical fibers each transmitting electromagnetic radiation to separate selective absorber structures.

Another object of the invention is to provide an infrared scene projector having spaced-apart optical fibers transmitting electromagnetic radiation to separate selective absorber structures, which absorb the radiation, convert it to heat, and emit radiation in the infrared range.

Another object of the invention is to provide a cost-effective transducer of electromagnetic radiation that projects an IR scene in real time with acceptable spatial resolution.

Yet another object is to provide a cost-effective projector of an infrared scene using a plurality of separated optical fibers to provide acceptable spatial and thermal resolution.

Another object is to provide a cost effective infrared scene projector having coherent fiber arrays and selective absorber coatings.

A further object is to provide a transducer that can use a multitude of materials for absorbing incident electromagnetic radiation and converting it to heat.

Another object is to provide thermally isolated pixels made from optical fibers and selective absorber structures to produce high spatial resolution.

These and other objects of the invention will become more readily apparent from the ensuing specification and drawings when taken in conjunction with the appended claims.

DESCRIPTION OF THE PREFERRED EMBODIMENTS

Figure 1:
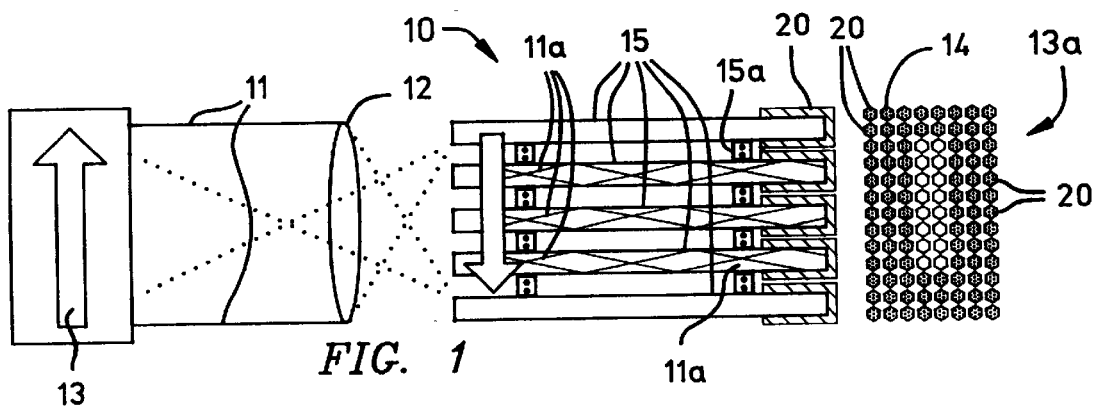
FIG. 1 is an infrared scene generator having a plurality of spaced-apart waveguides, such as optical fibers, each connected to a selective absorber structure; the center portion of the figure is exaggerated to show details.

Referring to FIG. 1, scene projector 10 receives electromagnetic radiation 11 that represents object 13 from a lens 12. The electromagnetic radiation can be that part of the electromagnetic spectrum called light that is made up of infrared light, visible light, and ultraviolet light, as well as that portion of the electromagnetic spectrum including x rays waves to microwaves. An image 13a of infrared radiation IR of object 13 is projected from projector end 14, that is schematically shown as an end-view at the right-hand part of the figure. Optionally, image 13a may be emitted at other spectral distributions of radiation that have longer wavelengths than electromagnetic radiation 11.

Projector 10 has a plurality of spaced-apart waveguides 15, such as optical fibers. Each optical fiber 15 transmits portion 11a of the incident electromagnetic radiation 11 by total internal reflection to a selective absorber structure 20 that is mounted on the opposite end of the optical fiber. Each of the interconnected optical fibers and selective absorber structures is spatially separated from other interconnected optical fibers and absorber structures to provide thermal isolation from one another and to reduce the possibility of thermal cross talk. The infrared selective emitting tips of the interconnected optical fibers and selective absorber structures are thermally isolated from the infrared selective emitting tips of the other interconnected optical fibers and selective absorber structures. For example, suitable plastic spacers 15a may be used and a vacuum may be introduced if desired to enhance the thermal isolation. Selective absorber structures 20 absorb portions 11a of the transmitted radiation, convert absorbed radiation to heat, and emit discreet portions of IR radiation or other image radiation 13a at longer wavelengths than the transmitted radiation. The array of separated optical fibers and their selective absorber structures of infrared scene projector 10 functions as pixels emitting an image 13a of IR radiation in a usable band for user devices.

Selective absorber structures 20 absorb the incident electromagnetic radiation, convert it to heat and emit radiation to form images representative of the source scene. The temperature of any one pixel increases in proportion to the intensity of the source radiation arriving at the selective absorber cavity. The intensity of the resulting infrared image is thus proportional to the intensity of the source scene. Bright areas of the source scene produce high temperature areas in the array which produce more intense radiation in the IR band of interest. For example, forward looking infrared, FLIR, data transferred to acetate film could be used to modulate light from a high intensity film projector focused on the base of the array. The resulting IR scene produced by the selective absorber transducers would be a reasonable IR representation of the original scene imaged by the FLIR. In addition, because the optical fibers and their selective absorber structures are separated, they are thermally isolated, and the problems associated with thermal cross talk that greatly limit the application of monolithic arrays are avoided.

An ideal black body absorbs all incident radiation, re-emits radiation according to the Planck radiation equation, and has an emissivity of 1.0. This black body is an ideal that does not exist and is an abstraction used to compare thermally induced electromagnetic radiation emitted by matter at temperatures greater than absolute zero. All real objects in the real world have emissivities less than one. The expression, selective absorber, is used herein to identify structures that, based on projector requirements, sufficiently follow the Planck radiation equation in a given band so as to be useful for an infrared projector.

In accordance with this invention the design of the selective absorber structure is discussed in Gouffe's analysis of black body design in "Infrared Systems Engineering" (Richard D. Hudson Jr., 1969, pp. 66–71). The discussion relates the effective black body emissivity of a given cavity to its geometric dimensions. Gouffe's analysis suggests that the effective emissivity of a cavity is:

$$\epsilon' = \frac{\epsilon(1+k)}{\epsilon(1-A/S)+A/S} \Rightarrow \epsilon' = \frac{\epsilon(1+k)}{d}$$

where: $\epsilon'$=the effective emissivity of the cavity; $\epsilon$=emissivity of the cavity walls; A=area of the opening through which radiation leaves the cavity; S=total surface area of the cavity, including that of the opening; $k=(1-\epsilon)(A/S-A/S_0)$; $S_0$=surface area of a sphere whose diameter is equal to the depth of the cavity (measured from the plane of the opening to the deepest point of the cavity).

Figures 2, 3:
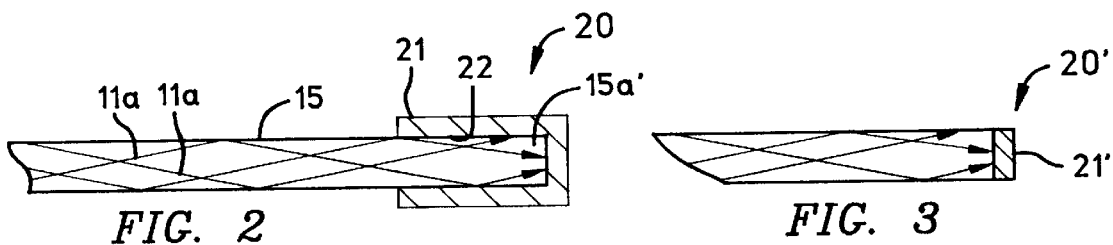
FIG. 2 shows a cross-sectional view of a can-shaped coating defining an absorber structure on the end of a waveguide.
FIG. 3 depicts a cross-sectional view of a disc-shaped coating defining an absorber structure on the end of a waveguide.

Referring to FIG. 2, waveguide 15 transmits electromagnetic radiation by total internal reflection to selective absorber structure 20. Selective absorber structure 20 is comprised of coating 21 deposited on end 15a' of waveguide 15 to define a selective absorber cavity 22 that has dimensions of 2r by L. The thickness of the coating or deposited layer, depends on the wavelengths of the electromagnetic radiation and the intensity. It is applied by any suitable deposition technique, such as chemical vapor deposition, sputtering, or evaporation and the thickness of the coating is selected to provide acceptable absorption of the impinging electromagnetic radiation and conversion to heat thereby resulting in increased emission of radiation of longer wavelength than that which would be observed at the ambient condition.

The can-shaped selective absorber structure 20 of FIG. 2 lends itself to Gouffe's analysis since it creates a cylindrical or can-shaped cavity that encompasses the end of the fiber. The total surface area of the cylindrical cavity (including the opening) is $2\pi r(L+r)$, and the area of a sphere with diameter equal to the depth of the cylinder is $4\pi L^2$. Substituting these relations into the above equations and making a variable change to a geometrical factor, g=L/r, leads to the following relations that are useful in relating the effective emissivity of the cavity to the real emissivity of the cavity wall and the geometric factor of the cavity, g:

$$k(\epsilon,g) = (1-\epsilon)\left(\frac{0.5}{g+1} - \frac{0.25}{g^2}\right)$$

$$d(\epsilon,g) = \epsilon\left(1 - \frac{0.5}{g+1}\right) + \frac{0.5}{g+1}$$

The effective emissivity as a function of the real emissivity and the geometric factor can be graphically represented. The effective emissivity is plotted as a surface above the xy plane, the geometric factor (L/r) is displayed along the x axis and the true emissivity of the cavity wall is displayed along the y axis. If the cavity material has low emissivity, the geometric aspects of the cavity can be adjusted to make the cavity act more like a black body. The ability to geometrically compensate for low emissivity materials is obvious and increases the number of design options when producing an infrared scene projector based on this approach.

Thus, it is apparent that the effective emissivity of a cavity, and hence its absorbtivity, can be increased by adjusting the geometry of the cavity. This aspect increases the latitude a designer has in selecting materials for the same projector. Coatings for cavities have been made with graphite particles (powder), paint, metal and dielectric films deposited on glass rods. The coatings need to be thick enough to be opaque for the incident radiation. If the coating is any thinner, some of the radiation is transmitted through the coating and is not available for heating. However, if the coating is too thick, unnecessary thermal mass is added to the system and the response time of the system is reduced. Clearly, the thickness depends on the materials being used to make the cavity. One skilled in the art to which this invention pertains can easily select the proper thickness for the material after the particular coating material is chosen and the wavelengths of the incident and emitted radiation are known. In our experience, the absorbtivity of the absorbing coating or layer can easily be adjusted to equal or be greater than $\geq 90\%$ for the incident radiation to produce unambiguous results.

All light conducted along the fiber enters the selective absorber cavity to be absorbed and converted to heat. The external surfaces of the cavity coating emit thermal radiation between 0.1 and 100 microns. The spectral radiance as determined by an external detector is determined by the real emissivity of the external surface of the cavity radiating toward a detector.

Looking to FIG. 3, selective absorber structure 20' is configured as disc-shaped coating 21' covering the end of the longitudinal projection of wave guide 15. The disc-shaped absorber coating 21' may be appropriate when a particular infrared image projector can rely entirely on the optical absorption properties of a two dimensional thin-film coating. It is possible in some cases to identify a material that, when applied as a two dimensional coating, provides sufficient absorption for a particular source of electromagnetic radiation that sufficient energy is converted to heat and thus allows infrared scene projection. In other words, the disc-shaped absorber can produce a purposeful image emission when the materials of the coating, the intensity and wavelength of the incident radiation, and the wavelengths of the radiation emitted are, by nature or design, suitable for the projector application.

Figure 4:
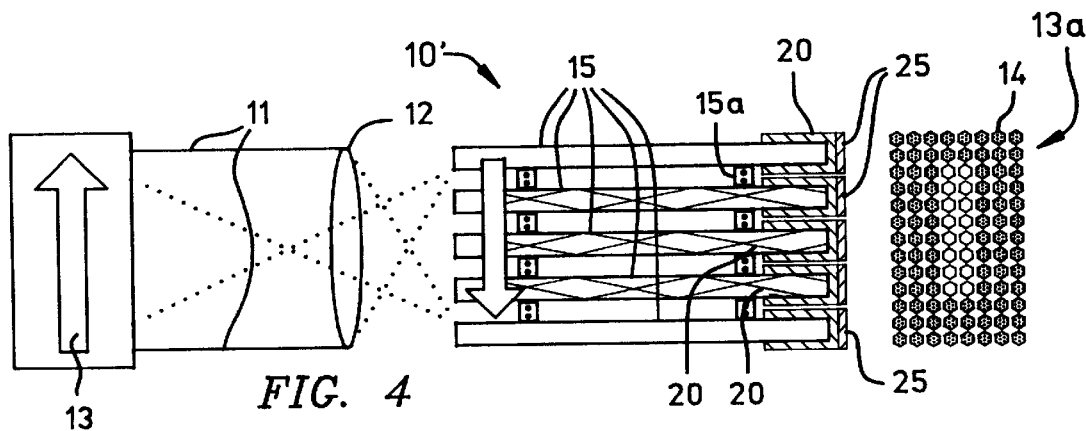
FIG. 4 is an infrared scene projector having a plurality of spaced-apart waveguides, such as optical fibers, each connected to an absorber structure and emitter coating; the center portion of the figure is exaggerated to show details.

FIG. 4 is another embodiment of the invention that enhances the emission of interest. Scene projector 10' is essentially the same as projector 10 and the same reference characters are used to identify essentially identical elements. However, a disc-shaped selective emitter with a higher in band emissivity coating 25 additionally is deposited on the longitudinal face of each absorber structure 20. Its designation higher emissivity coating means that it has a higher emissivity at the emitted wavelengths of interest than absorber structure 20, and as a result, it is added to the structures to increase radiation at the longer wavelengths. Higher emissivity selective emitter coating 25 is added to increase IR or other longer wavelength emission at the heated fiber tips. Some of the materials used that adequately function as the higher emissivity coating are indium antimonide, lead sulfide, mercury cadmium telluride metal oxides, metal sulfides, and dielectric films. Having this inventive concept before him, a routineer may exercise considerable latitude in selecting the right material for the higher emissivity coating based on the desired wavelengths of emitted radiation.

Figures 5, 6:
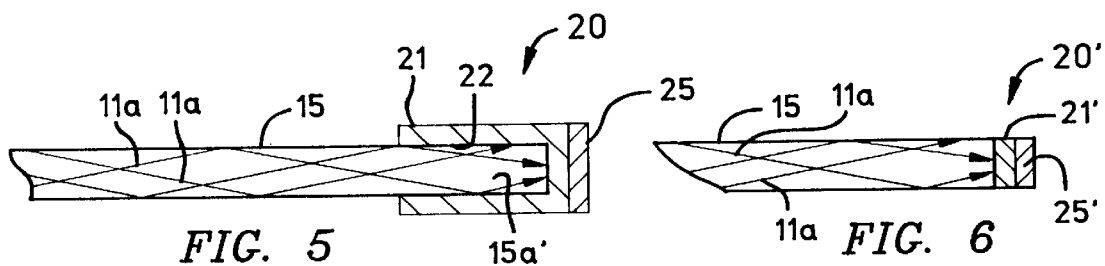
FIG. 5 shows a cross-sectional view of a higher emissivity emitter coating on the can-shaped absorber coating.
FIG. 6 is a cross-sectional view of a higher emissivity emitter coating on the disc-shaped absorber coating.

FIG. 5 shows in greater detail the arrangement of a single can-shaped selective absorber structure 20 deposited on waveguide 15 which may be an optical fiber. This design has disc-shaped higher emissivity selective emitter coating 25 deposited on the longitudinal face of structure 20. FIG. 6 is yet another variation of this inventive concept. Selective absorber structure 20' is configured as disc-shaped coating 21' covering the longitudinal projection of end 15a' of wave guide 15. Disc-shaped higher emissivity emitter coating 25' is deposited on the longitudinal face of structure 20'.

IR images have been produced in a device like that shown in FIG. 2. The absorber structure was a can-shaped graphite coating that had an L/r ratio equal to 6 on a 0.125 inch diameter quartz rod. 6328 Angstrom radiation from a 2 mW HeNe laser was transmitted through the rod to the coating which absorbed the radiation, converted it to heat and emitted an IR image observed in the 3 to 5 micron band. Another IR image was produced with 6328 Angstrom radiation from a 2 mW HeNe laser by an array of separated optical fibers and their associated absorber coatings. The array was made up of 200 micron diameter fibers on 230 micrometer centers. Increasing efforts to improve spatial resolution for the IR scene projector call for reducing the diameters of the fibers. Micromachining techniques can be used to build micro-arrays that incorporate absorber coatings.

The geometry of the can-shaped absorber cavity has been explained above. Other cavities defined by appropriate absorber coatings may be chosen as the situation calls for. The disc-shaped absorber coating effectively reduces the cavity length L to zero. This usually compels the use of a wavelength selective high absorptivity material for the coating. Consequently, the inherent optical properties of a film (coating or series of films (coatings) to absorb the visible energy and convert it to heat are relied upon instead of depending on geometric variance for enhancement of cavity absorption to convert the visible energy to IR light.

A transducer according to this inventive concept can absorb energy at one or more wavelengths that are conducted along one or more fibers. This energy is converted to heat and emitted at longer wavelengths. This absorption-conversion-and-emission process can be duplicated in serially connected fibers and absorber/emitter structures that re-emit at longer wavelengths.

A high resolution visible-scene-to-infrared-scene transducer has been presented but the idea could also work for UV-to-visible or other transitions to longer wavelengths of emissions, for example. Multi-layers of absorber coatings and high emissivity emitter coatings are within the scope of this inventive concept. Since many single material coatings usually only absorb efficiently and, therefore, emit efficiently at a few discreet wavelengths, one coating may not be a good emitter in the band of interest, for example, 3–5 microns or 8–12 microns. Multi-layer thin film structures may be used that can be tuned to absorb or emit at specific wavelengths. Such structures are typically antireflection coatings on lenses or missile domes or on band pass filters for detectors and sensors but they can be used to absorb and emit when deposited on the ends of optical fibers. Scene projectors fabricated to include these multi-layer coatings are within the scope of this inventive concept which uses an absorber structure on a fiber optic element to convert from a transmitted wavelength of radiation to an emitted wavelength of radiation by absorption, conversion to heat and thermal emission. As much of the incident radiation (wavelength specific) is absorbed as is necessary to produce a change in temperature that is sufficient to yield the IR intensity (band specific) required. The option to include a higher emissivity coating requires that the coating has an emissivity sufficient to produce the desired IR intensity (band specific) at reasonable temperatures. Furthermore, the high emissivity coating could be a coating with an emissivity (absorbtivity) tradeoff dependent on the source wavelength, source intensity, IR band of interest and IR radiance requirements.

Figure 7:
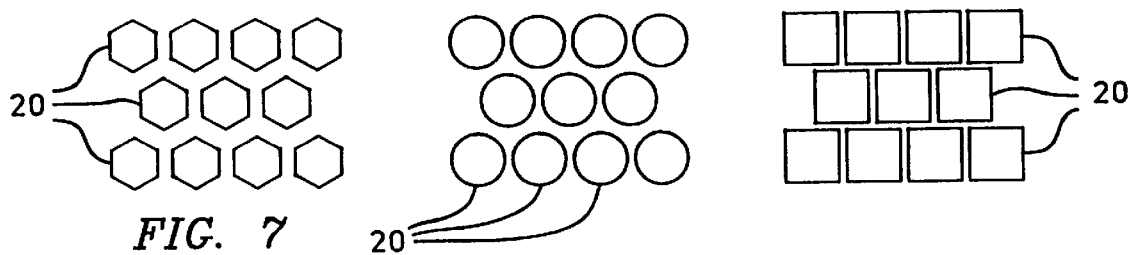
FIG. 7 shows end views of typical fiber array geometries.

The embodiments of the invention depicted in FIGS. 1 and 4 show only a few optical fibers 20 and their respective absorber structures. It is to be understood that these representations are intended to be illustrative of this invention and that large arrays of multitudes of separated fibers, absorber structures and, optionally, high emissivity emitter coatings can be fabricated in accordance with this inventive concept. These arrays can be arranged in a host of different geometric patterns, such as shown by the portions of exemplary arrays in FIG. 7.

Obviously, many modifications and variations of the present invention are possible in light of the above teachings. It is therefore to be understood that within the scope of the appended claims, the invention may be practiced otherwise than as specifically described.

We claim:

1. A transducer of electromagnetic radiation to infrared radiation comprising:

a plurality of waveguides to transmit electromagnetic radiation, said plurality of waveguides having a separation between one another; and a plurality of absorber structures each disposed on an end of a separate one of said plurality of waveguides to absorb said electromagnetic radiation, to convert said absorbed radiation into heat, and to emit radiation having longer wavelengths than said electromagnetic radiation;

each of said absorber structures comprising a can-shaped coating defining an absorber cavity; and a selective emitter coating disposed on said can-shaped coating having a higher infrared emissivity than said can-shaped coating.

2. A transducer according to claim 1 whereby the separated waveguides and absorber increase thermal resolution as compared to adjacent waveguides and black bodies.

3. A transducer according to claim 1 whereby said plurality of waveguides are optical fibers that transmit said electromagnetic radiation by total internal reflection, and said emitted radiation is infrared radiation.

4. A transducer according to claim 1 whereby each of said absorber structures has an opening 2r and a depth L to contain an end of a separate one of said plurality of waveguides.

5. A transducer of electromagnetic radiation to infrared radiation comprising:

a plurality of waveguides to transmit electromagnetic radiation, said plurality of waveguides having a separation between one another; and a plurality of absorber structures each disposed on an end of a separate one of said plurality of waveguides to absorb said electromagnetic radiation, to convert said absorbed radiation into heat, and to emit radiation having longer wavelengths than said electromagnetic radiation;

each of said absorber structure comprising a disc-shaped coating on said end of a separate one of said plurality of waveguides;

a selective emitter coating disposed on said disc-shaped coating having a higher infrared emissivity than said disc-shaped coating.

\* \* \* \* \*